Oct. 9, 1956   L. D. FIELD ET AL   2,765,538
INSPECTION APPARATUS
Filed Nov. 9, 1954   2 Sheets-Sheet 1

INVENTORS
Leonard D. Field
BY & Sol Chidel.

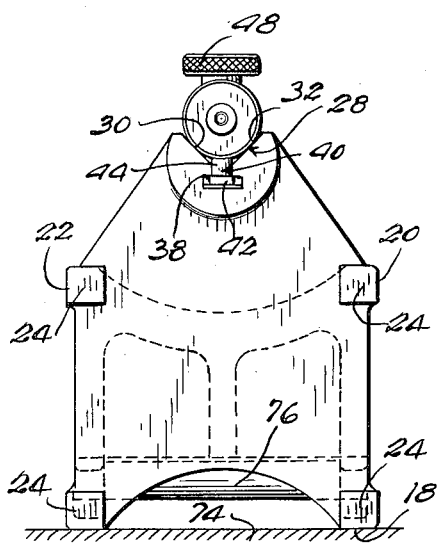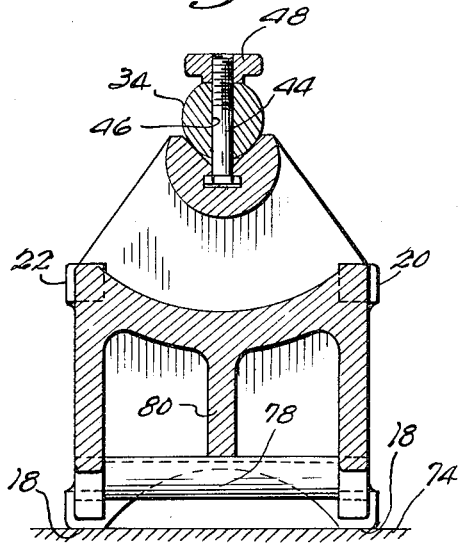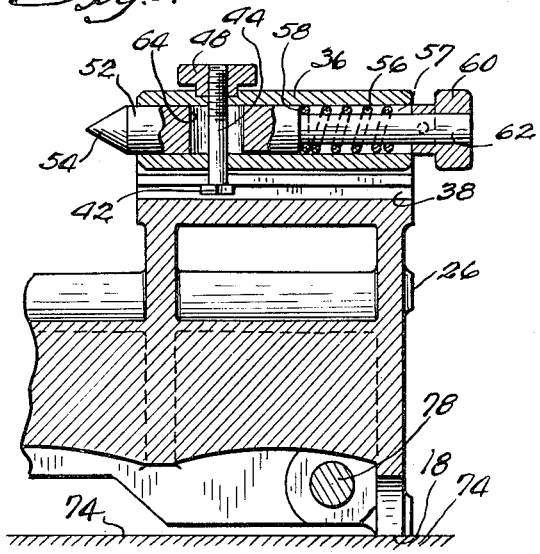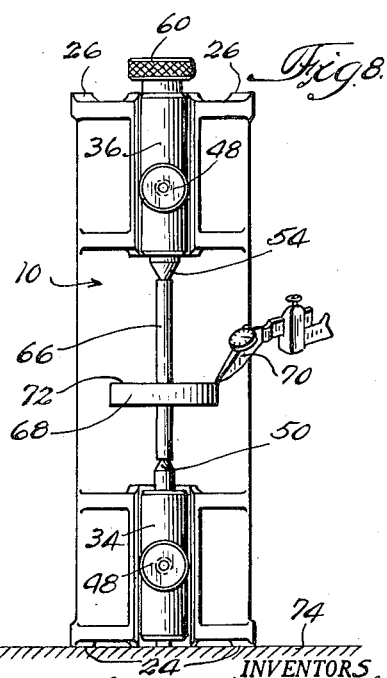

United States Patent Office 2,765,538
Patented Oct. 9, 1956

2,765,538

INSPECTION APPARATUS

Leonard D. Field and Sol Chidel, Chicago, Ill.

Application November 9, 1954, Serial No. 467,734

3 Claims. (Cl. 33—174)

This invention relates to improved inspection apparatus and more particularly to apparatus for accurately mounting an article of manufacture in known spacial relationship to an indicating and measuring device whereby the dimensions of such an article may be accurately determined.

It is a principal object of this invention to provide a versatile and portable tool capable of accurately measuring various physical characteristics of an article of manufacture.

In the various metal working arts many parts are manufactured by screw machine and lathe operations by which the resulting article has irregular surfaces of revolution. It is frequently desirable to accurately determine the relationship of these various surfaces to the axis of revolution of the part. By surface measurements, eccentricities and other errors, which might appear in a finished article as a result of errors in the machine tools and mountings, become quickly apparent. For example, in a lathe operation the jaws of a lathe chuck may be slightly off center resulting in a machine part having outer surfaces eccentric with respect to the axis of rotation of the part or surfaces which are not perfectly round. The particular characteristics of machine parts which must be determined in such machine parts include roundness, concentricity of diameters to centers, concentricity of diameters to one another, runout or nonperpendicularity of a face or shoulder to the axis, parallelism of faces or shoulders to one another, squareness of holes to a parallel or transverse axis, and taper.

It is therefore desirable to provide means for measuring the physical dimensions of the article both during the manufacturing stages and as a final inspection of the finished product. Such measurements, to be of value, must give information which is independent of the manufacturing machine. Thus the part when mounted in the centers of the machine cannot be accurately measured, as the determinations would reflect errors in both the product and the machine.

It is therefore a further object of this invention to provide apparatus for mounting articles of manufacture having known centers whereby the dimensions thereof may be accurately determined either during the manufacturing process or subsequent thereto.

It is another object of this invention to provide apparatus which is portable and thus capable of use at a manufacturing machine for determining the physical dimensions of an article being manufactured.

It is a further object of this invention to provide apparatus having a pair of coaxial centers adapted to receive various articles of manufacture in a known physical relationship to a plurality of orthogonally related planes.

It is an additional object of this invention to provide improved apparatus having a pair of coaxial centers adapted to receive an article of manufacture and having a predetermined vertical, horizontal or angular relationship to a surface plate or any flat surface.

It is still another object of this invention to provide mounting apparatus having a pair of coaxial centers adapted to receive an article of manufacture in which the centers are axially adjustable, at least one of said centers being resiliently urged in the direction of the other.

Further and additional objects of this invention will become obvious from a consideration of this specification, the accompanying drawings and the appended claims.

In one form of this invention apparatus is provided which is capable of receiving any body of revolution between a pair of known coaxial centers oriented in a predetermined orthogonal relationship to a plurality of surfaces. More particularly apparatus is provided having a frame which is rectilinear in nature and has a bottom, two sides and two ends which are accurately ground to define perpendicular planes within extremely close tolerances. A pair of cone-like centers are mounted in aligned relationship parallel to the bottom and sides of the frame and adjustable to receive the article under test therebetween. A pair of spaced cylindrical elements are also disposed in the frame and adapted for mounting on two vertical supports of known dimensions which rest on a given flat surface whereby the axis of the centers is disposed at a known acute angle relative to said surface.

For a more complete understanding of this invention reference will now be made to the accompanying drawings wherein:

Fig. 3 is an end view of the embodiment of Fig. 1;

Fig. 4 is a transverse sectional view taken along the line 4—4 of Fig. 1;

Fig. 5 is a longitudinal sectional view of a portion of the embodiment of Fig. 1, taken along the line 5—5 thereof;

Fig. 8 illustrates the embodiment of Fig. 1 in use for determining the runout of a transverse surface of a cylindrical body.

Figure 1:
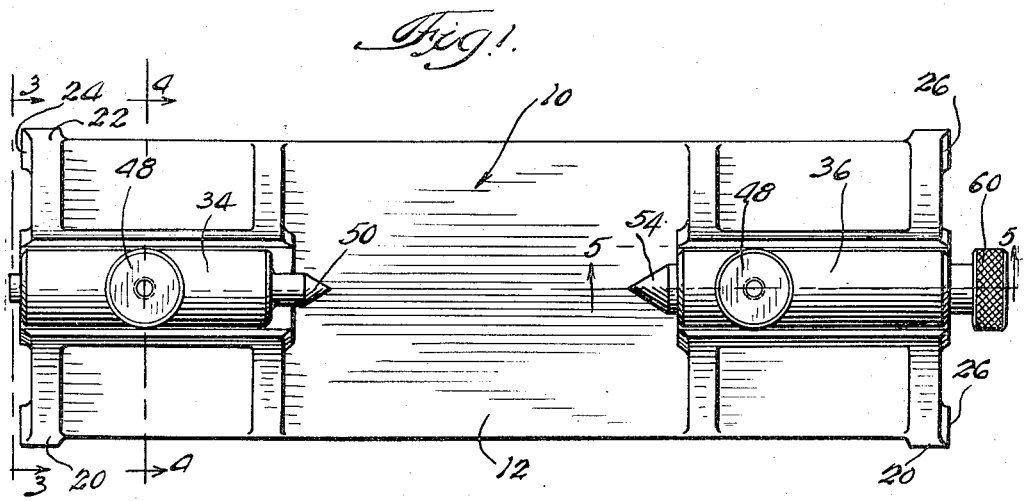
Fig. 1 is a top plan view of one embodiment of this invention.
Figure 2:
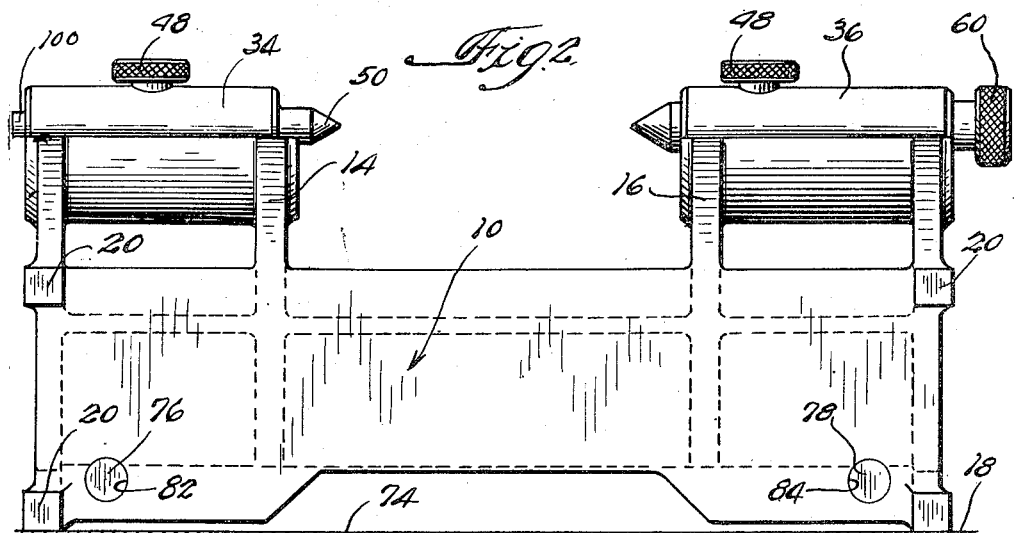
Fig. 2 is a front elevational view of the embodiment of Fig. 1.

Referring now to the drawings and more particularly to Figs. 1, 2 and 3, the illustrated embodiment of this invention comprises a frame 10 having an elongated base portion 12 and a pair of legs 14 and 16 extending upwardly therefrom. The frame 10 is preferably a casting of a semisteel alloy having a hollow webbed internal structure. A plurality of protuberances or bosses 18, 20, 22, 24, and 26 extend outwardly from the bottom, sides and ends of the frame respectively. These protuberances are accurately ground to define planes which are normal to one another within the limits of accuracy required by the particular circumstance in which the inspection apparatus is employed. In one particular embodiment of this invention these surfaces are ground or lapped to an accuracy of .0005 inch which is sufficient for most tool room uses. The apparatus of this invention is designed to rest upon a ground surface 74 such as a tool maker's bench or the bed of a machine tool. When resting on the bottom, sides or ends, the remainder of the surfaces are accurately oriented with respect to the tool maker's bench and any of these surfaces may be used for gaging, as desired.

The legs 14 and 16 of the frame 10 are formed with V-shaped cradles 28 therein as shown most clearly in Fig. 3. Each cradle comprises two planar surfaces 30 and 32 which are accurately ground at right angles to one another in such a manner that the plane which bisects the angle of intersection of the surfaces 30 and 32 will be parallel to the planes defined by the protuberances 20 and 22 on the sides of the frame 10. Furthermore, the plane bisecting the angle formed by surfaces 30 and 32, as well as the line of intersection, is perpendicular to the planes defined by end protuberances 24 and 26. A pair of cylindrical elements 34 and 36 are carried in the cradles 28 of legs 14 and 16 respectively and each has a conical end portion accurately defining the axis of said cylinders. Cylinders 34 and 36 are slidably mounted in legs 14 and 16 and rest on the surfaces 30 and 32 thereof. A T-shaped slot 38 is formed at the bottom of each of the V-shaped cradles and is adapted to receive a locking member 40 therein. The locking member 40 has a head 42 slidable in the T-shaped slot 38 and a shaft 44 extending upwardly in an appropriate aperture 46 in the cylindrical element 34. The upper end of shaft 44 is threaded to receive a knurled locking nut 48. This construction is most clearly shown in the sectional views of Figs. 4 and 5.

In the cylindrical element 34, a conical end portion 50 is integrally formed therewith to prevent axial movement relative to the remainder of the element. The second cylindrical element 36 on the other hand has a circular bore therethrough in which a solid cylindrical plunger 52 is received. The plunger 52 is axially movable within the cylindrical element 36 and has a conical end portion 54. The conical end portion 54 is normally urged outwardly from within the cylindrical element 36 by a coil spring 56 engageable between a collar portion 57 of the element 36 and the rearward shoulder 58 of cylinder 52. A knob 60 is secured to a reduced portion 62 of the cylinder 52 whereby the conical end 54 thereof may be drawn rearwardly into the element 36. This construction provides an axially movable conical center which facilitates ready insertion and removal of an article of manufacture during use of the subject apparatus. The plunger 52 has an elongated slot 64 therein through which the shaft 44 passes, whereby the locking means 40 may function in the T-slot 48 without interfering with the motion of the plunger 52 under the influence of coil spring 56.

One particular use of the apparatus above described is illustrated in Fig. 8. Therein an article of manufacture having a shaft 66 and a flywheel 68 forming a part thereof is positioned between the fixed conical center 50 and resiliently mounted center 54. A dial indicator gage 70 is schematically illustrated having a feeler or probe in engagement with the upper surface 72 of the flywheel. The dial indicator 70 will be mounted on a stand supported on a surface 74 accurately ground or scraped for use in bench testing. The portable test centers of this invention also rest on the flat surface 74. By rotating the shaft 66 between the centers 50 and 54 the dial indicator 70 will indicate the relationship of the surface 72 to the axis of shaft 66. If the surface 72 is precisely normal to the axis, the dial indicator will register no variations with respect to the surface 74. However, if the surface 72 is angularly related to the shaft 66 an indication of runout will be read on the indicator 70. As shown in Fig. 8 the ground bosses 24 formed on the end of the frame 10 are resting on the flat surface 74, whereby the orthogonal relationship of the axis of the shaft 66 to the surface 74 is insured.

Figures 6, 7:
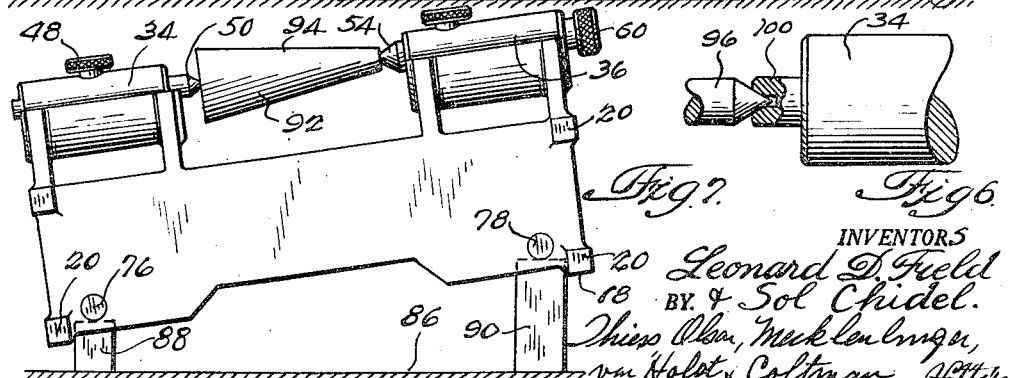
Fig. 6 is a partial view of one center support adapted for use with this invention.
Fig. 7 illustrates the embodiment of Fig. 1 in use for determining the accuracy of a tapered part.

A pair of hardened cylindrical rods 76 and 78 extend through the lower portion of the frame 10 below the central web 80. The rods 76 and 78 are disposed in accurately bored apertures 82 and 84 whereby the relationship of the line between the centers of the two rods 76 and 78 and the line defined by the centers of the cylindrical elements 34 and 36 accurately approaches parallelism. Rods 76 and 78 are spaced an accurately controlled predetermined distance apart, said distance being ten inches in one particular embodiment of this invention. The rods 76 and 78, being accurately disposed in a plane parallel to the axis of cylindrical elements 34 and 36 and being a known distance apart, render the described invention useful as a sine bar. The use of the subject invention as a sine bar in measuring the taper of an article of manufacture is illustrated in Fig. 7. Therein, the apparatus is mounted above a flat surface 86 on a pair of accurately dimensioned blocks 88 and 90. The apparatus is mounted on the blocks 88 and 90 in such a manner that the rods 76 and 78 are the only portions of the apparatus in engagement with the blocks. Thus, knowing the distance between the rods 76 and 78 and the difference between the vertical dimensions of the blocks 88 and 90, the angle formed by the axis of elements 34 and 36 with respect to the planar surface 86 may be accurately calculated. A tapered part 92 is shown mounted between the centers 50 and 54 in a manner rendering the subject apparatus useful for determining the accuracy of tapered parts. A dial indicator gage similar to that illustrated in Fig. 8 may be mounted in a conventional support on the planar surface 86 to engage the upper edge 94 of the article 92 which is being tested. By observing the readings of the dial indicator gage as the gage is moved axially along the length of the part 92, the accuracy of the taper of the part may readily be determined.

While the parts under test which are illustrated in Figs. 7 and 8 have depressions formed in the ends thereof to receive the conical centers 50 and 54, certain articles of manufacture may, on the contrary, have pointed ends not adapted for use with conical centers. In this event the opposite end of the cylindrical element 34 is utilized to receive the pointed part. This is illustrated in Fig. 6 wherein the part 96 under test is illustrated as having a pointed end portion 98 which is received in the apertured end 100 of the cylindrical element 34. It will be clear from the description above that the cylindrical element 34 may be removed from the cradle by unthreading the locking nut 48, sliding the element 34 in such a manner that the flange 42 is removed from the T-slot 38, reversing the element 34 and reinserting the flange 42 into the T-slot 38. Tightening the locking nut 48 will once again insure axial alignment of the element 34 with the cooperating cylindrical element 36. By employing the various adjustments available in the apparatus, piece parts may accurately be measured having diameters up to five inches and having lengths between 0 and 6 inches. For accurate measurements of articles which are larger than the capacity of the particular apparatus herein described additional apparatus may readily be conceived by one skilled in this art by employing the teaching of this invention.

All such apparatus utilizing the teaching herein, namely, the provisions of a plurality of orthogonally related surfaces in spaced relationship to a pair of known centers resting in V-shaped cradles and any of the individual details thereof are believed to be within the spirit and scope of this invention.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. Inspection apparatus for aid in obtaining precision measurements comprising an elongated rectilinear metal base having two substantially parallel side webs, a plurality of protuberances formed in said base, the ends of said protuberances defining precisely bottom, side and end planes of orientation upon which the apparatus may be alternatively positioned for operation, each of said planes being normal to the other said planes, said side surfaces being substantially parallel to and outwardly disposed from said webs two center defining elements, two leg portions extending upwardly from the base opposite the bottom plane of orientation, a V-shaped groove formed in each of said legs to support said center defining elements therein, said grooves being in coaxial relationship parallel to the bottom and side planes of orientation, and normal to the end plane, a T slot formed in each of said legs at the apex of the corresponding V groove, locking means extending through each of said center elements and engaging the corresponding T slot, and two coplanar cylindrical supporting elements of the same diameter disposed within said rectilinear base between said side webs in predetermined spaced relationship substantially perpendicular to said side plane and equally spaced above said bottom plane btewween the ends of said base said bottom plane having open portions whereby said apparatus may rest on said supporting elements.

2. A compact inspection apparatus for aid in obtaining precision measurements comprising an elongated rectilinear metal base having two substantially side webs, a plurality of protuberances formed in said base, the ends of said protuberances defining five reliably accurate orthogonally disposed supporting surfaces including a bottom surface, two upstanding side surfaces outwardly disposed from and generally parallel to said side webs and two upstanding end surfaces, two center defining elements, two leg portions extending upwardly from the base opposite said bottom surface, a V-shaped groove formed in each of said legs to support said center defining elements therein in coaxial relationship parallel to said side surfaces and bottom surface and normal to the end surfaces, a T slot formed in each of said legs at the apex of the corresponding V groove, locking means extending through each of said center elements and engaging the corresponding T slot, and two coplanar cylindrical supporting elements having the same diameter disposed in predetermined spaced relationship in said base between said side webs in perpendicular relationship to said side surfaces and equally spaced upwardly from said bottom surface between said end surfaces, at least one of said center defining elements being resiliently urged into an article engaging position said bottom plane having open portions whereby said apparatus may rest on said supporting elements.

3. A compact inspection apparatus for aid in obtaining precision measurements comprising an elongated rectilinear metal base having two substantially parallel side webs, a plurality of protuberances formed in said base, the ends of said protuberances defining five reliably accurate orthogonally disposed supporting surfaces including a bottom surface, two upstanding side surfaces outwardly disposed from and generally parallel to said side webs and two upstanding end surfaces, two center defining elements, two leg portions extending upwardly from the base opposite said bottom surface, a V-shaped groove formed in each of said legs to support said center defining elements therein in coaxial relationship parallel to said side surfaces and bottom surface and normal to the end surfaces, a T slot formed in each of said legs at the apex of the corresponding V groove, locking means extending through each of said center elements and engaging the corresponding T slot, and two coplanar cylindrical supporting elements having the same diameter disposed in predetermined spaced relationship in said base between said side webs in perpendicular relationship to said side surfaces and equally spaced upwardly from said bottom surface between said end surfaces said bottom plane having open portions whereby said apparatus may rest on said supporting elements.

References Cited in the file of this patent

UNITED STATES PATENTS

| 2,369,425 | Becker | Feb. 13, 1945 |
| 2,409,924 | Bauer | Oct. 22, 1946 |
| 2,536,629 | De Sousa | Jan. 2, 1951 |

FOREIGN PATENTS

| 610,792 | Great Britain | Oct. 20, 1948 |